UNITED STATES PATENT OFFICE.

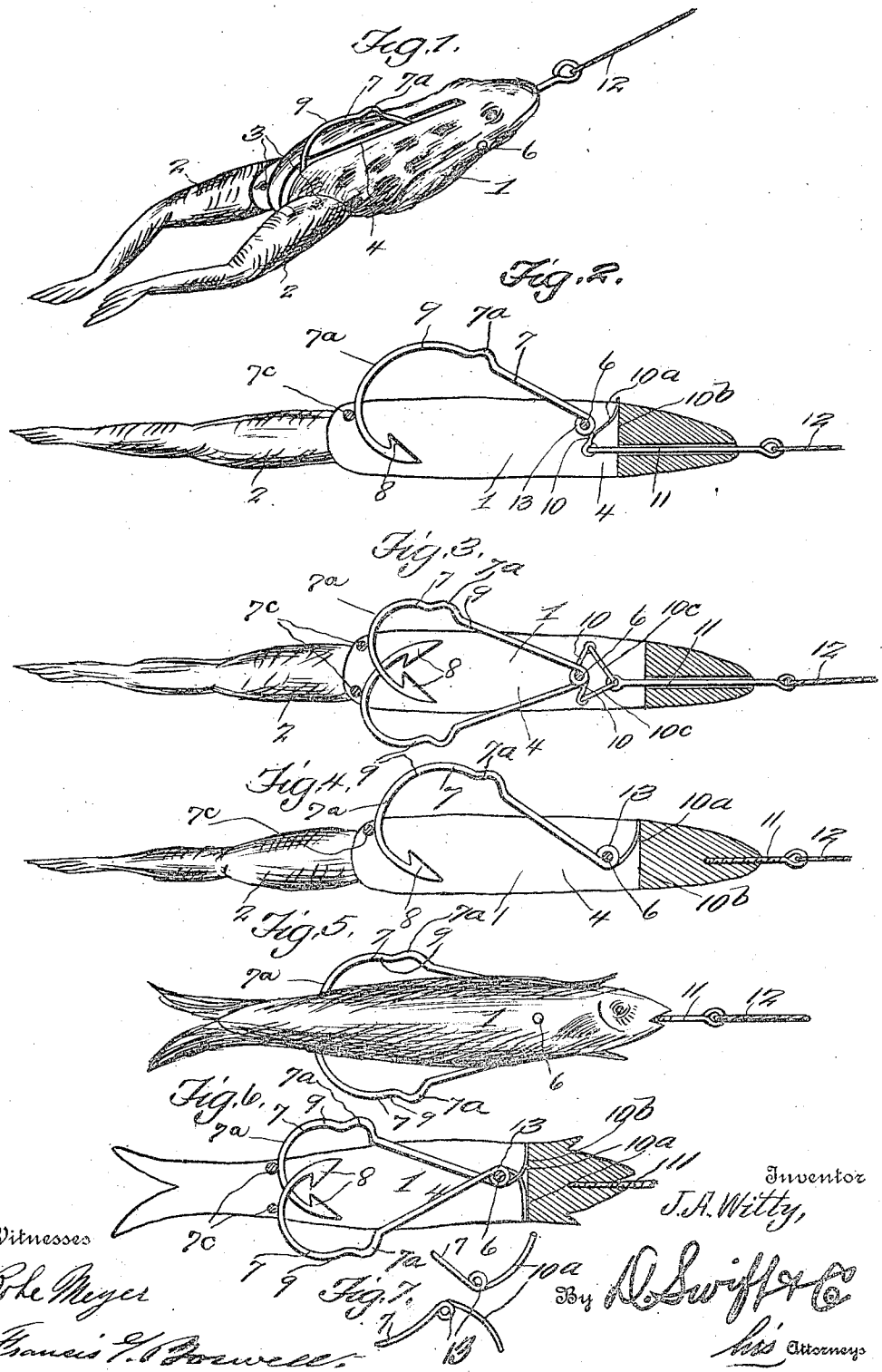

JOHN A. WITTY, OF WHITEHALL, MICHIGAN.

ARTIFICIAL BAIT.

1,173,694.

Specification of Letters Patent. Patented Feb. 29, 1916.

Application filed September 19, 1912. Serial No. 721,192.

*To all whom it may concern:*

Be it known that I, JOHN A. WITTY, a citizen of the United States, residing at Whitehall, in the county of Muskegon and State of Michigan, have invented a new and useful Artificial Bait; and I do hereby declare the following to be a full, clear, and exact description of the invention, such as will enable others skilled in the art to which it appertains to make and use the same.

This invention relates to a new and useful artificial bait.

As one of the objects of the invention it is the aim to provide an artificial bait, to represent a frog, or a minnow or the like having fish hooks, so arranged and obscured from view, that when a pulling action is imparted upon the fish line, the hook will be actuated, in order to pierce the fish, that is, after the bait has been swallowed by the fish.

One of the features of the invention, is that the harder the pulling action is upon the fish line, the farther the hook will pierce the fish.

Another object is to provide the bait with single or double fish hooks.

Another object of the invention is that when the bait represents a frog, the top and bottom thereof may be painted to represent bellies, so that when the same is cast out among the weeds or reeds or the like, it matters not which side is down or up, especially if the bait is to be used as a floating bait on the top of the water. In some cases the bait is to represent a complete frog, and designed to float under the surface of the water.

In the drawings certain features of construction are disclosed, and in practical fields the patentee has the the right to alterations, provided the alterations are comprehended within the scope of what is claimed.

The invention comprises further features and combination of parts, as hereinafter set forth, shown in the drawings and claimed.

In the drawings: Figure 1 is a view in perspective of a bait representing a frog. Fig. 2 is a sectional view through the same, showing the mounting of a single fish hook. Fig. 3 is a view similar to Fig. 2 showing a double fish hook. Fig. 4 is a view showing a different form of hook. Fig. 5 is a view of a bait, representing a minnow. Fig. 6 is a sectional view through Fig. 5. Fig. 7 is a view of the eye ends of a pair of hooks showing the spring arrangement as in Fig. 6.

Referring more particularly to the drawings, 1 designates the body of the bait, which may represent either that of a frog, minnow or the like. In cases where the body represents a frog, the legs 2 are secured to the body by the connections 3. The body of the bait, whether it is the representation of a frog or a minnow or the like, is provided with a slot 4.

Extending transversely of the body and the slot is a pivot pin 6, on which is pivoted a fish hook 7, the body of which hook is so shaped, as to protrude slightly beyond the body of the bait, so as to hold the hook end 8 of the fish hook concealed. When the bait is swallowed by a fish, the protruding portion 9 of the fish hook is struck by the jaws of the fish, in order to throw the hook end outwardly from the body of the bait, so as to pierce the fish. In Figs. 1, 2 and 3 the fish hooks are provided with extensions 10, to which is connected one end of an eye pin 11, which partially slides in the body of the bait, and to the eye of this pin the fish line 12 is connected. It will be seen that when the fish hook is actuated to pierce the fish, a pulling action may be imparted upon the fish line, in order to further actuate the hook, and the harder the pulling action is, the farther the hook pierces the fish.

In Fig. 4 the fish hook is constructed of one piece of material, formed in a coil 13, which is mounted upon the pivot pin, there being enough resiliency in the wire of the hook, in order to hold the body portions of the hooks protruded. However, the resiliency of the hooks is not sufficient to prevent the jaws of the fish from actuating the hooks.

From the foregoing it will be seen that there has been devised a simple and efficient artificial bait, and one which has been found desirable and practical.

The protruding portions 9 of the fish hooks 7 are provided with bulges 7ª, with which jaws of a fish contact in order to insure that the fish hooks will be depressed. These bulges 7ª engage the transverse pins 7°, and owing to a pulling action on the line 12, the bulges 7ª yieldably engage the pins 7°, thereby yieldably holding the spears 8 normally within the slot. When the artificial bait is caught by the fish, the jaws of the fish come in contact with the protruding parts 9 of the hooks, pressing the hooks toward each other, thereby overcoming the resiliency in the bulges 7ª, and causing said bulges to spring past the pins 7ᶜ, in which case the spears 8 will protrude from opposite sides of the artificial bait, in order to pierce the jaws of the fish.

The invention having been set forth, what is claimed as new and useful is:—

An artificial bait comprising a body member provided with an elongated slot, a pivot pin extending transversely through said body member, and transversely across said elongated slot, a fish hook pivoted upon said pin and having its substantially curved back portion protruding from the slot when in inoperative position, a second pin extending transversely through the slot at its other end, and with which the curved yieldable portion of the fish hook adjacent the hook proper engages, so as to yieldably hold the spear of the hook normally within the slot, the pivoted end of the hook having a lateral extension, a member slidably mounted in the body longitudinally and having a connection with the extension, the back portion of the hook to be depressed by the jaws of the fish to throw the hooked end of the hook outwardly, and upon a pulling action upon said member the hooked end is actuated further to pierce the fish.

In testimony whereof I have signed my name to this specification in the presence of two subscribing witnesses.

JOHN A. WITTY.

Witnesses:
EMMA J. WITTY,
Mrs. A. S. BILLINGS.